Sept. 27, 1960     A. H. FOWLER ET AL     2,953,918

RANGE INCREASER FOR PNEUMATIC GAUGES

Filed Feb. 20, 1959     2 Sheets-Sheet 1

INVENTORS.
Andrew H. Fowler &
Garland B. Seaborn, Jr.

BY

ATTORNEY

United States Patent Office 2,953,918
Patented Sept. 27, 1960

2,953,918

RANGE INCREASER FOR PNEUMATIC GAUGES

Andrew H. Fowler and Garland B. Seaborn, Jr., Oak Ridge, Tenn., assignors to the United States of America as represented by the United States Atomic Energy Commission Filed Feb. 20, 1959, Ser. No. 794,789

4 Claims. (Cl. 73—37.5)

This invention relates to an improved pneumatic gauge in which the range of the gauge has been increased to insure good linearity over a wider range without excessive air consumption.

In conventional pneumatic gauges, an air nozzle is positioned close to, but not in contact with, a workpiece whose thickness is to be measured. The restrictive effect of the workpiece on the jet of air issuing from the nozzle is a function of the clearance between the workpiece and the nozzle. The nozzle is in a fixed position with respect to a base upon which the workpiece is positioned in the thickgauge. Under selected conditions, therefore, the thickness of the workpiece can be determined by measuring either the air flow to the nozzle or the back pressure produced by this flow in an antechamber disposed upstream of the nozzle and downstream of a flow-restricting element.

It is known to the art that a linear relationship of flow to nozzle-to-workpiece clearance is obtained only if the clearance is within certain limits. In other words, the clearance can be either too large or too small for good linearity. It is these clearance limits which restrict the linear range of conventional gauges. If, for example, the nozzle-to-workpiece clearance is larger than one-quarter of the diameter of the nozzle opening, the workpiece has no effect on flow. For good linearity, the clearance should be less than one-sixth the diameter of the nozzle opening. This requirement can be met by making the nozzle opening relatively large, but enlargement of the opening markedly increases air consumption and results in "air blasting" of the workpiece.

With a knowledge of the limitations of conventional gauges with respect to their linear range, it is a primary object of this invention to provide a pneumatic gauge in which the linear range is increased.

It is another object of this invention to provide a pneumatic gauge with an increased linear range without excessive air consumption.

Figure 1:
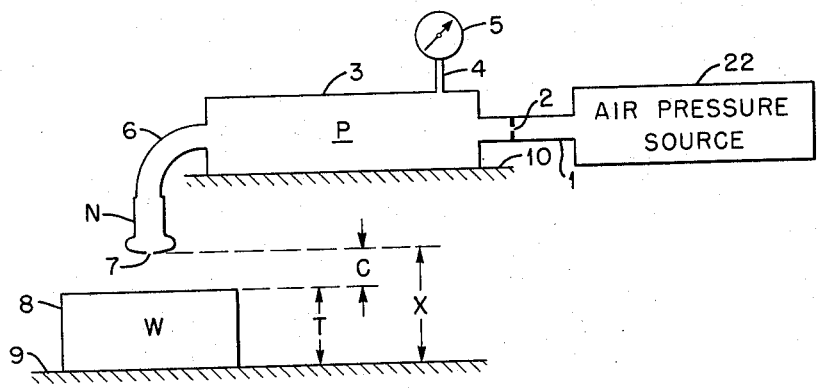
Figures 2, 5:
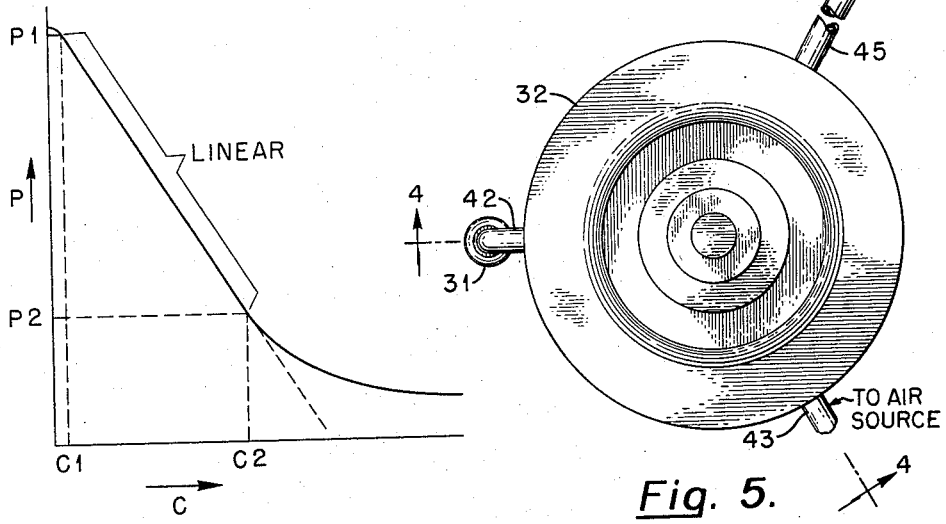
Figure 3:
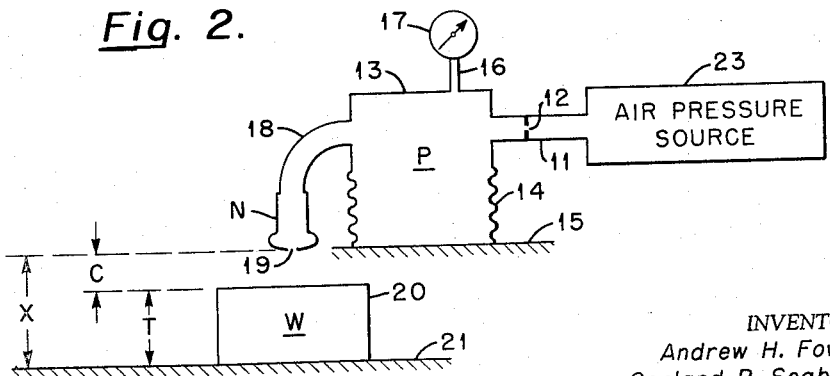
Figure 4:
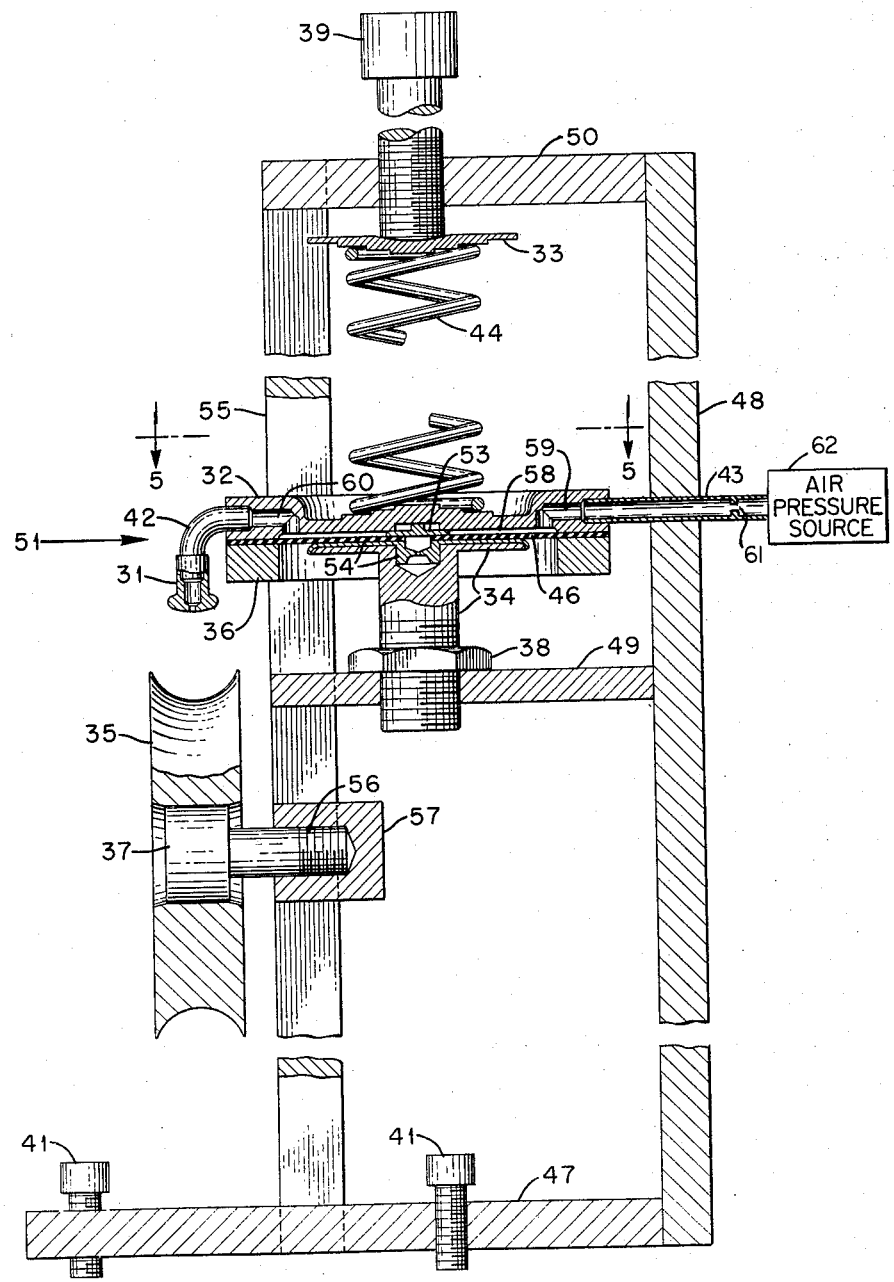

These and other objects and advantages of this invention will be apparent from a consideration of the following detailed specification and the accompanying drawings wherein:

Fig. 1 is a schematic diagram for a conventional pneumatic gauge arrangement for measuring the thickness of a workpiece, Fig. 2 is a graph correlating back pressure and nozzle-to-workpiece clearance for pneumatic thickness gauges, Fig. 3 is a schematic diagram of an improved pneumatic gauge incorporating a bellows chamber, Fig. 4 is a sectional view on the line 4—4 of Fig. 5 of another embodiment of an improved pneumatic gauge incorporating a diaphragm, and Fig. 5 is a sectional view of the top of the diaphragm assembly 51 on the line 5—5 of Fig. 4.

The above objects have been accomplished in the present invention by providing an expansible antechamber connected to the nozzle so that the position of the nozzle with respect to the workpiece is varied automatically by variation in pressure within the antechamber. Such an arrangement increases the linear range of the gauge as more fully discussed below.

Referring now to Fig. 1, there is illustrated a typical pneumatic thickness gauge. An air nozzle 7 is positioned close to, but not in contact with, a workpiece 8 whose thickness is to be measured. Workpiece 8 rests upon a fixed support 9. Nozzle 7 is connected to an antechamber 3 through a tubular member 6. Antechamber 3 is attached to a fixed support 10, and is connected to a source of air pressure 22 through tubular member 1 which has an orifice 2 disposed therein. Antechamber 3 is connected to a pressure gauge 5 through a tubular member 4. The restrictive effect of the workpiece on the jet of air issuing from the nozzle is a function of the clearance between the workpiece and the nozzle. Under selected conditions, therefore, the thickness of the workpiece can be determined by measuring either the air flow to the nozzle by means not shown, or the back pressure produced by this flow in the antechamber by gauge 5.

As pointed out above, a linear relationship of flow to nozzle-to-workpiece clearance is obtained only if the clearance is within certain limits. The relationship of clearance and back pressure is illustrated graphically in Fig. 2. As shown, linear operation is obtained if the clearance is larger than a minimum value $C_1$ and smaller than a maximum value $C_2$. The back pressures corresponding to these clearances are designated as $P_1$ and $P_2$, respectively. If, as shown in Fig. 1, the distance from the nozzle to the work-supporting surface be represented by X and the thickness of the workpiece by T, then:

$$T_{max.} = X - C_1$$

and $$T_{min.} = X - C_2$$

Subtraction of these equations gives:

$$T_{max.} - T_{min.} = C_2 - C_1$$

Thus the usable thickness range of the gauge is the difference between the maximum and minimum clearances.

We have discovered that we can increase the linear range of the gauge of Fig. 1 by providing means for permitting the antechamber to be expansible with respect to a fixed base, so that variation of the back pressure produces a corresponding variation in X. Fig. 3 illustrates one embodiment in which the principles of this invention may be carried out. In Fig. 3, a nozzle 19 is connected by tubular member 18 to an expansible antechamber 13, which is made expansible by the bellows 14 which is an integral part of the antechamber. The bellows 14 is affixed to a fixed support 15. The antechamber 13 is connected to a source of air pressure 23 through a tubular member 11 with an orifice 12 disposed therein. Antechamber 13 is connected to a pressure gauge 17 through a tubular member 16. Gauge 17 is calibrated in terms of thickness of the workpiece 20. Air nozzle 19 is positioned close to, but not in contact with, a workpiece 20 whose thickness is to be measured. Workpiece 20 rests upon a fixed support 21. Since the bellows 14 is fixed to base 15, variation of the back pressure P produces a corresponding variation in X, the distance between the nozzle 19 and the work-supporting surface of support 21. The system is so designed that $X = KP$, where K is a constant for the bellows. With this arrangement, $$T_{max.} = X_{max.} - C_1$$

and $$T_{min.} = X_{min.} - C_2$$

Subtraction of these equations gives, $$T_{max.} - T_{min.} = X_{max.} - X_{min.} + (C_2 - C_1)$$

Thus, compared with the standard gauge of Fig. 1, the range of the improved gauge has been extended by the quantity $X_{max.}-X_{min.}$. Since $X=KP$, then $$X_{max.}=KP_{max.}=KP_1$$

and $$X_{min.}=KP_{min.}=KP_2$$

Thus, the range of the improved gauge is expressed as follows:

$$T_{max.}-T_{min.}=K(P_1-P_2)+(C_2-C_1)$$

where $K(P_1-P_2)$ represents the increase in range.

Referring now to Fig. 4 which illustrates another embodiment of a pneumatic gauge in which the principles of this invention may be carried out, a bed plate 47 has a vertical frame 48 rigidly attached thereto. The bed plate has three leveling bolts 41, only two of which are shown, threaded therein and spaced in a triangular manner. The frame 48 includes a rigid support plate 49 which is positioned above the bed plate 47 and which extends parallel thereto. Threadedly assembled to the support plate 49 is an upstanding T-shaped diaphragm platform 34. A nut 38 is threaded on member 34 to lock it to plate 49 in a selected position. Positioned on the platform 34 is an annular assembly 51, termed a diaphragm assembly. The assembly 51 is in the form of an inverted cup, and lies parallel to the bed plate 47. The assembly 51 is formed with a side inlet 43 for pressured air, a side outlet 45, as shown in Fig. 5, for connection to a conventional air pressure gauge 63 calibrated in units of workpiece thickness, and a down-turned side outlet 42 terminating in a vertically-extending air nozzle 31. The air inlet 43 is connected, through an orifice 61 or other flow-restricting element, disposed in inlet 43, and to a suitable regulated air supply 62. The diaphragm assembly 51 also includes shallow cup-shaped mount 32 and a clamping ring 36. Clamped between the rim of the member 32 and the ring 36 is a standard rubber diaphragm 46. This diaphragm 46 acts as an airtight seal for the pressure chamber 58 and also permits relative movement of the mount 32 with respect to the bed plate 47 in response to variations in pressure within the chamber 58, as more fully discussed below. The central portions of the upper and lower sides of the diaphragm are backed by metal disks 53 and 54 respectively. The lower disk 54 normally rests upon the diaphragm platform 34. The disk 53 separates the diaphragm 46 from the mount 32 and thus forms an annular chamber 58. Chamber 58 is connected by means of conduit 59 to the side inlet 43, by a similar means, not shown, to a pressure gauge 63, and by a conduit 60 to side outlet 42 leading to air nozzle 31.

The frame 48 also includes a rigid plate 50 which is positioned above the support plate 49 and which extends parallel thereto. Threaded through plate 50 is a pressure screw 39 whose lower end bears upon an annular pressure plate 33. The pressure plate 33 rests upon a vertically-extending helical spring 44, whose lower end bears upon the central portion of the diaphragm mount 32. The screw 39, the spring 44, and the threaded portion of the diaphragm platform 34 are in axial alignment. The plates 49 and 50 are also affixed to two vertical parallel strips 55, only one of which is shown. The strips 55 are also affixed to the bed plate 47.

Mounted below the air nozzle 31 is a wheel 35 formed with a dished rim designed for reception of a tube which is to be gauged. The wheel 35 is supported by means of a suitable axle 56 and bearing 37 disposed around axle 56 and affixed to the wheel. Axle 56 is in turn threadedly secured in a member 57 which is affixed to and supported by the parallel strips 55, aforementioned. The vertical center line of wheel 35 is in alignment with that of the air nozzle 31. With this arrangement, a tube supportably engaged with the wheel 35 will lie directly under the nozzle 31.

Since the lower disk 54 normally rests upon the diaphragm platform 34, as set forth above, an increase in the air pressure within the chamber 58 will urge the mount 32 upward, in a direction opposing the pressure exerted by the spring 44. Assuming a given superatmospheric pressure within the diaphragm chamber 58, it will be apparent that variations in this pressure will produce proportional changes in the position of the mount 32 with respect to the bed plate 47, and therefore will produce a proportional change in the position of the nozzle 31 with respect to a tube supported by the wheel 35. If, then, a tube of variable diameter is passed over the wheel 35, the tubing-to-nozzle clearance will tend to change. Should this clearance tend to increase, there will be a decrease in the "back pressure" prevailing in the chamber 58. As a result, the mount 32 will be moved proportionally closer to the base plate 47 by the spring 44, restoring the tubing-to-nozzle clearance to nearly the same value as before. It should be apparent that this arrangement will operate in an analogous manner to minimize decrease in the tube-to-nozzle clearance.

The pneumatic gauge set forth in Fig. 4 operates upon the same principle as that for Fig. 3, and the linear range of the gauge of Fig. 4 is increased in the same manner as that for Fig. 3. Thus, in both embodiments the position of the nozzle with respect to the fixed base is varied automatically by variations in pressure within the antechamber, thereby increasing the linear range of the gauges as fully discussed above.

This invention has been described by way of illustration rather than limitation and it should be apparent that the invention may be carried out by structures other than those described, and that the invention is equally applicable in other fields.

What is claimed is:

1. Pneumatic gauge apparatus for measuring variations in the thickness of a workpiece, comprising a first fixedly positioned support upon which the workpiece may be rested, an air nozzle positioned above and directed against said workpiece such that the nozzle-to-workpiece clearance is always equal to the distance between said support and said nozzle minus the thickness of said workpiece, an air pressure system for said nozzle comprising a second fixed support, an antechamber resting on said second support, a connection between said antechamber and said nozzle, an orificed inlet for said antechamber, and means for supplying a source of constant air pressure to said orificed inlet, a pressure gauge connected to said antechamber for measuring the back pressure therein as a function of the thickness of said workpiece, and means for adjusting the position of said nozzle in response to the back pressure within said antechamber such that increases in antechamber pressure produce proportional increases in the distance between said first support and said nozzle, and decreases in the pressure within said antechamber produce proportional decreases in the distance between said first support and said nozzle.

2. The gauge set forth in claim 1, wherein the means for adjusting the position of said nozzle comprises a bellows which is interposed between said antechamber and said second fixed support and which communicates with said antechamber, whereby said antechamber, nozzle and the connection therebetween are automatically adjusted to different positions as a unit in response to variations in back pressure within said antechamber and bellows.

3. The gauge set forth in claim 1, wherein the means for adjusting the position of said nozzle comprises a diaphragm forming one side of said antechamber, said diaphragm having a central portion resting on said second fixed support, and an adjustable resilient means disposed on the opposite side of said antechamber for controlling the movement of said opposite antechamber side within selected limits in response to changes in back pressure within said antechamber, whereby the position of said nozzle is automatically adjusted in response to changes in said back pressure.

4. An improved pneumatic gauge for measuring variations in the thickness of a workpiece, comprising a fixedly positioned support upon which the workpiece may be rested, an air nozzle, means for positioning said air nozzle directly above said support and said workpiece and directing said nozzle against said workpiece such that the nozzle-to-workpiece clearance is always equal to the distance between said support and said nozzle minus the thickness of said workpiece, a source of air pressure, means for connecting said source of air pressure to said nozzle, means connected to said connecting means for measuring the pressure of air supplied to said nozzle as a function of the thickness of said workpiece, and means for adjusting the position of said nozzle in response to the pressure in said connecting means such that increases and decreases in pressure in said connecting means produce proportional increases and decreases, respectively, in the distance between said support and said nozzle.

References Cited in the file of this patent

UNITED STATES PATENTS 2,728,223     Herrman     Dec. 27, 1955